INVENTOR
Jean Louis Laboulais

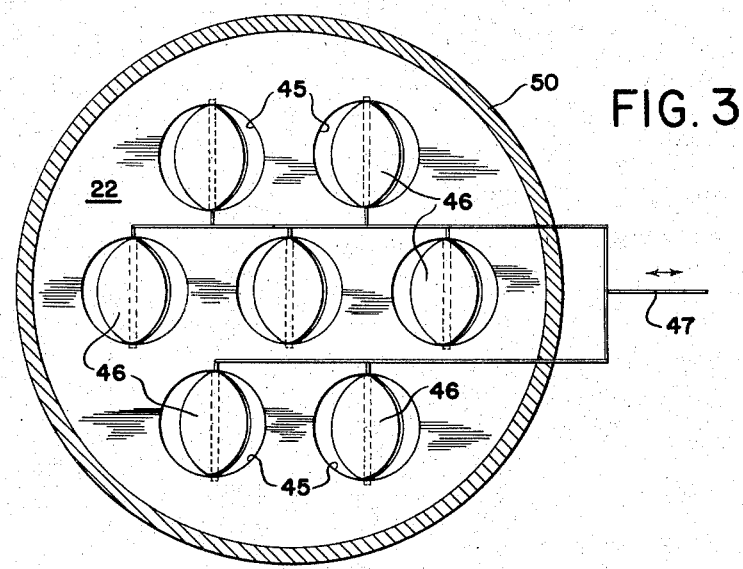
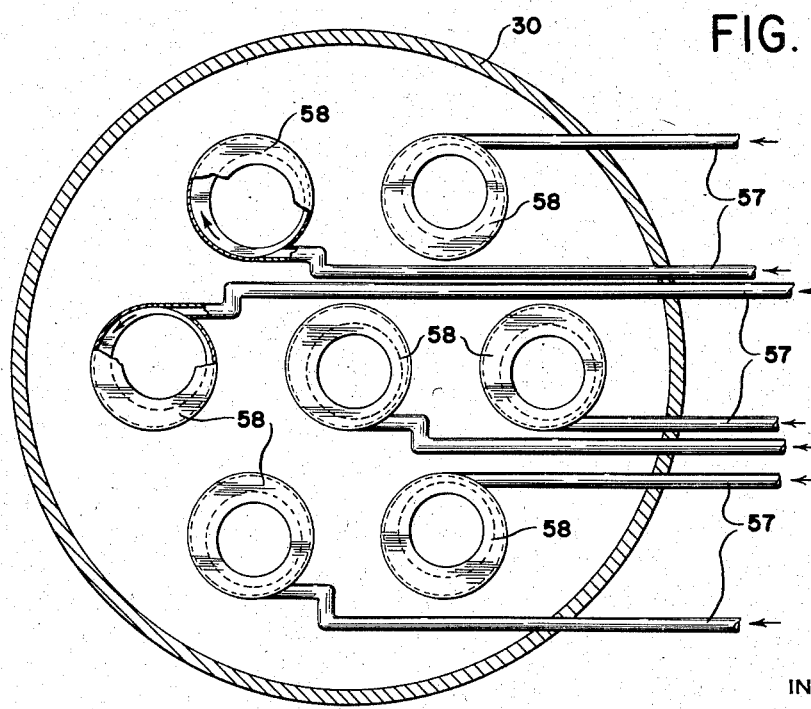

United States Patent Office 2,883,173
Patented Apr. 21, 1959

2,883,173

METHOD AND APPARATUS FOR PREHEATING FINELY DIVIDED KILN CHARGE WITH HIGH TEMPERATURE GASES FROM THE KILN

Jean Louis Laboulais, Greenwich, Conn., assignor to Kennedy Van Saun Mfg. & Eng. Corporation, New York, N.Y., a corporation of Delaware Application November 22, 1955, Serial No. 548,410

4 Claims. (Cl. 263—32)

My invention relates to improvements in method and apparatus for preheating finely-divided solid materials, more particularly the raw feed stock used in the manufacture of cements, such for example as Portland cement.

In the handling of feed stock for conversion into cement clinker, it is highly desirable to preheat the feed stock to as high a temperature as possible before it is introduced into the clinkering kiln, otherwise, according to past experience, the kiln must be of great length. The expense involved in building rotary clinkering kilns of great length, of from 300 to 500 feet, for example, is so high that various types of preheaters have been provided for preheating the charging material.

Known types of preheating apparatus are so expensive that there is some question about the overall savings. For example, one known installation includes a vertically-arranged series of contact zones and alternating refractory-lined cyclone separators through which the gases from the kiln are directed. A considerable degree of preheating of fine material is achieved in apparatus of this type but the additional cost of construction and maintenance is so high as to be almost as great as that involved in building excessively long rotary kilns.

Furthermore, in such preheating apparatus, the flow velocities are so high that the finely-divided solid material is carried over from the preheater to such an extent that additional cyclone or other types of separators are required. Another disadvantage in that these separators and related equipment must be constructed of or lined with refractory materials in order to withstand the temperatures of the kiln gases. On the other hand, difficulties have been encountered with certain mixes for making cement because of fusion and agglomeration of some of the alkaline constituents and their adherence to the walls of the ducts and cyclone separators.

The primary object of the present invention is, therefore, to provide a preheater for pulverulent dust-like feed stock for calcining and clinkering apparatus and a method of preheating which will avoid the difficulties and expense encountered in apparatus of the type referred to above, and at the same time to provide adequate and effective utilization of high-temperature kiln gases for preheating pulverized solid material for conversion into cement clinker.

A further object of the invention is to provide an improved method for substantially instantaneously heating pulverulent solid materials, such as the feed stock for making Portland cement by intimate contact with high temperature kiln gases at a position such that the resulting heated material is delivered directly into the kiln.

In accordance with my invention, I have discovered that the pulverulent solid material may be heated instantly by distributing it directly and uniformly into the high temperature kiln gases in a heating zone of considerable cross-sectional area compared to that of the kiln. The up-flow velocity of the gases is controlled and they are so uniformly distributed in the heating zone that substantially all of the pulverized material falls therethrough in an unobstructed manner and takes up the heat of the gases.

The preheating chamber, therefore, according to my invention, is a substantially vertical chamber without interior obstructions or deflecting means and located adjacent the inlet of the kiln, so that the high temperature gases flow from the kiln into the chamber and upwardly therethrough at a substantially uniform reduced velocity over the whole cross-sectional area of the preheating chamber. The chamber is sufficiently large in cross-sectional area compared to that of the kiln that only a minor amount of dust is carried to the upper part of the chamber, while on the other hand, the continuously falling uniformly-distributed solid material moves downwardly through the chamber countercurrent to the rising gases and is delivered directly into the kiln. The gases discharged from the kiln at a temperature of from 1750° to 2000° F. and at the normal kiln velocity are greatly reduced in velocity as they leave the kiln and enter the preheating chamber, and by the time they reach the upper part of the preheating chamber they are cooled down by the feed stock to a temperature in a neighborhood of from 500° to 600° F.

The apparatus preferably includes a dust separator receiving the low-temperature gases from the upper part of the preheating chamber, this dust separator being connected to the inlet of a fan or inducing means which discharges the gases at a relatively low temperature and substantially free of dust into a stack. The fan may be used to induce or control the flow of gases through the chamber and kiln at the required velocities.

The preheating chamber is preferably defined by a surrounding wall or walls of refractory metal spaced from a surrounding refractory brick wall or walls, and means is provided for bypassing high temperature gases around the metal wall or walls of the preheating chamber at a controlled rate for heating the metal wall. Means is provided for regulating the quantity and velocity of the up-flowing gases in the preheating chamber in relation to that flowing around and bypassing the chamber.

The operation is preferably and advantageously conducted so that pulverized solid material, for example comprising the raw feed stock for the manufacture of Portland cement and of a fineness so that 90% will pass through a 200 mesh screen, is preheated to a temperature approximating that of the gases leaving the kiln. Where the kiln gases are at a temperature of from 1750° to 2000° F. the charging material is heated to a temperature of 1725° F. or higher, and in a properly balanced operation, not more than about 5% of the fine dust is carried over from the preheating chamber into the dust separator.

Because of the almost instantaneous heating of the pulverized solid feed stock in the preheating chamber and the high temperature of the gases, from 25 to 40% of this material is calcined, and with at least some cement mixes, there is a certain amount of agglomeration of fine particles, which apparently contributes to the relatively low carry-over of dust to the dust separator. Any carry-over dust is returned to the high temperature gases in the preheating chamber where it is contacted not only with the hot gases but also with the downwardly-moving pulverized fresh stock in the chamber.

Another advantageous result accruing from the invention is a considerable reduction in the fine particles carried from the kiln by the high temperature gases. In conventional operations it is expected that at least 15% or more of the material fed to the kiln will be carried out of the preheater with the kiln gases. In accordance with the method of the present invention, the velocity of the gases leaving the kiln is greatly reduced and the feed from the preheating chamber is delivered onto the bottom of the kiln. These features coupled with the fact that a very high degree of calcination of the feed and $CO_2$ removal therefrom is achieved in the preheating zone, there is a comparatively low content of fine material in the gases leaving the kiln.

The invention includes various control and other features of importance, as well as other advantages, described more in detail hereinafter in connection with one embodiment of an apparatus as shown in the accompanying drawings forming a part of this application.

In the drawings:

Fig. 2 is a horizontal sectional view taken on the line 2—2 of Fig. 1; and

Fig. 3 is a horizontal sectional view taken on the line 3—3 of Fig. 1.

Figure 1:
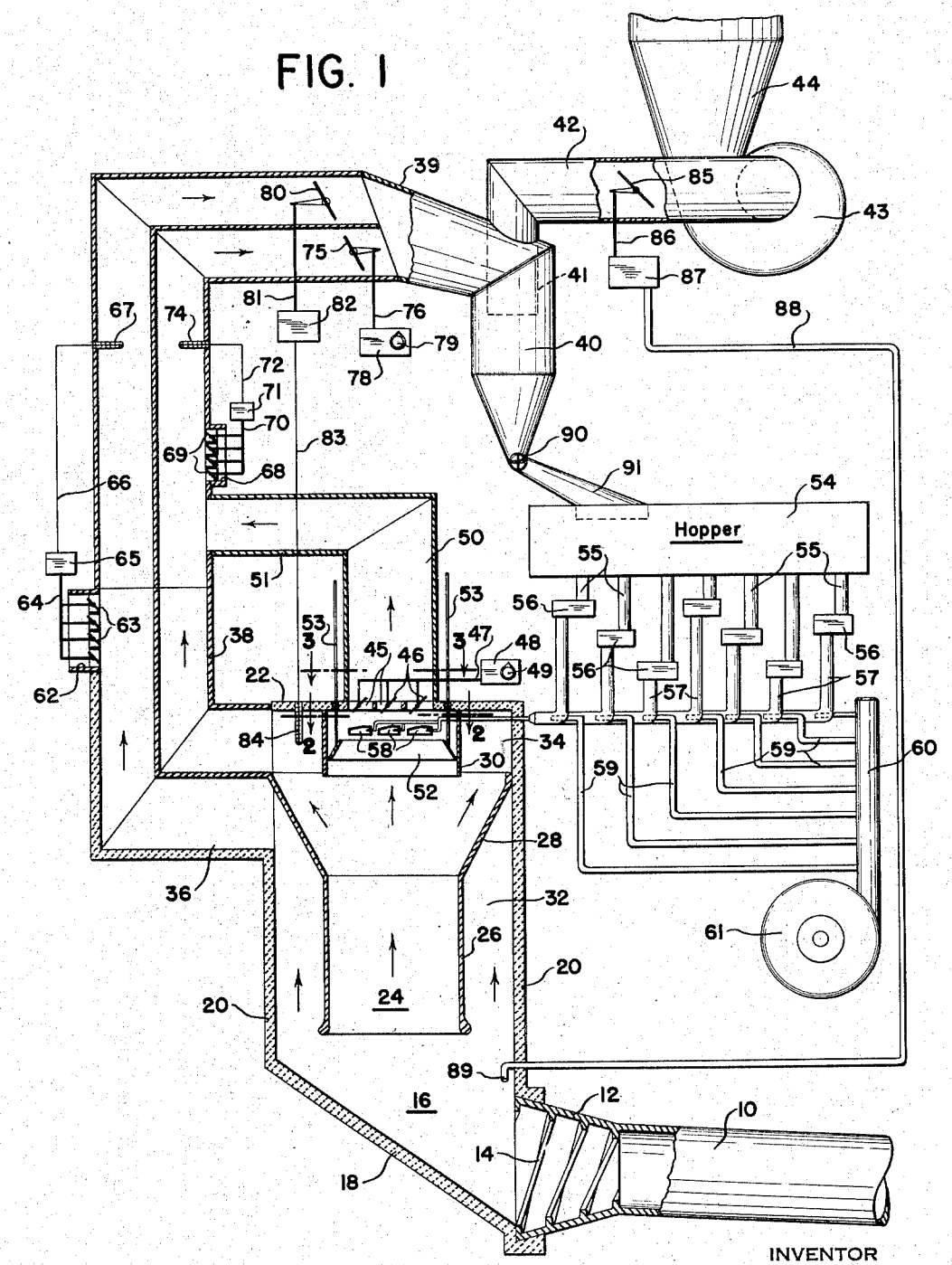
Fig. 1 is a broken diagrammatic view partly in vertical section showing an apparatus constructed and arranged in accordance with the invention.

The apparatus shown in Fig. 1 of the drawings comprises a rotary cement kiln 10, operated in the usual manner to produce Portland cement and in which high temperature gases pass countercurrent to the cement feed stock as preheated in accordance with the invention. The feed end of the kiln 10 advantageously includes an integral flaring section 12 of frusto-conical shape arranged to progressively increase the cross-sectional area toward the inlet end and effect a consequent reduction in the velocity of the kiln gases before they leave the kiln. The section 12 is provided with internal spiral fins or vanes 14 of refractory material for feeding preheated feed stock upwardly from the lower portion of the inlet of the section 12 into the cylindrical part of the rotary kiln. The section 12 opens directly into a dust settling chamber 16 having a sloping wall 18 down which preheated feed stock slides to the kiln section 12. The chamber 16 forms the lower part of the preheater structure including a cylindrical tower having a refractory outer wall 20 and a refractory top 22, in the confines of which, the preheating operation takes place in accordance with the invention.

A large part of the interior of the tower 20 comprises a preheating zone or chamber per se at 24 defined in part by a cylindrical wall 26 concentric with the tower and supported by a funnel-shaped continuing wall section 28, the upper end of which extends to and is attached to the wall 20. The chamber 24 is open at the bottom and at the top, and a cylindrical wall 30 of refractory sheet metal and of the same diameter as the cylindrical wall 26 is supported from the roof 22 with its lower open end spaced above the wall 26 in the manner shown in Fig. 1. The cylinders 26 and 30 are concentric and respectively define uniform annular passageways 32 and 34. The passageways 32 and 34 respectively connect into large gas ducts 36 and 38 which open through the side of the tower wall 20 respectively opposite the wall sections 28 and 30. The gas ducts 36 and 38 discharge into a single duct section 39 connected tangentially into a cyclone separator 40 having the usual central gas outlet 41 connected into a duct 42, which leads to the intake of a blower or exhauster 43 discharging through a duct 44, which is connected into a stack.

The roof 22 is provided over its entire area with a plurality of uniformly distributed gas outlet passageways 45, as shown in Fig. 3, three of which are also shown in Fig. 1. These passageways are controlled by dampers 46 connected to a common control lever or levers 47 extending to a control 48 having a hand-operated control or knob 49. The passageways 45 open into a large cylindrical duct 50 surrounding all of the passageways 45 and connected by a duct 51 into the gas duct 38. An annular wall scraper, including a blade 52 and operating bars 53, is normally located in the upper part of the space inside the curtain wall 30, but is forced downwardly by suitable known mechanical means into the chamber 24 where it is used to scrape the inside of the wall 26 to free any material which may have accumulated thereon.

The means for supplying and feeding the raw stock for making cement, as shown in Fig. 1, comprises a hopper 54 containing the pulverized raw feed stock, a multiplicity of ducts 55 connected into the bottom of the hopper for conducting the pulverized stock therefrom to individual weighing devices 56 set to discharge equal weights of the pulverized feed stock through individual ducts 57 extending into the space within the cylinder 30 and respectively connected into individual distributors 58, three of which are shown in Fig. 1 and seven of which are shown in Fig. 2 by way of example. The distributors 58 are uniformly spaced over the cross-sectional area within the cylindrical apron 30 and each is adapted to evenly distribute its charge of pulverized material downwardly over the adjacent area. The distributors 58 may be of any known type designed to distribute pulverized material substantially uniformly. In the present instance, they are illustrated as shallow cylindrical members opening downwardly, into which the respective ducts 57 extend tangentially. The pulverized feed stock delivered into the tubes 57 by the weighing devices 56 is advantageously blown into the distributors 58 respectively by streams of air or other gaseous fluid delivered through ejector pipes 59, respectively extending into the pipes or ducts 57. The air or gaseous medium is delivered under pressure through the pipes 59 from a distributor pipe 60 connected into a blower 61. The blower 61 may deliver atmospheric air into the ducts 57 and distributors 58 or it may be connected into the gas duct 42 or 44 to take kiln gases at a temperature of approximately 400° F. for distributing the pulverized material into the space below the distributors 58.

The duct 36 is provided with an air inlet passage 62 controlled by dampers 63 operated by a lever 64 extending from an automatic control 65 connected through wiring 66 to a thermocouple 67. The gas duct 38 includes a similar control arrangement for admitting air including an inlet passageway 68 controlled by dampers 69 operated by a lever 70 extending from an automatic control 71. This control is connected through wiring 72 with a thermocouple 74 located in the duct 38 downstream of the air inlet 68. A damper 75 is provided in the duct 38 and connected by a lever 76 with a control 78 having a control handle or knob 79 for manual control. The duct 36 is provided with a similar damper 80 operable by a lever 81 connected into an automatic control 82 which, in turn, is connected by wiring 83 with a thermocouple 84 located in the upper part of the passageway 34 adjacent the inlet of the duct 38. The suction applied by the blower or exhauster 43 is controlled by a damper 85 located in the duct 42 and connected by a lever 86 into an automatic control 87. The control 87 is responsive, through a pipe 88, to the gas pressure in the lower part of the tower 20, into which the pipe 88 extends and terminates at the point 89.

In the operation of the apparatus described above, the kiln gases at a temperature approaching 2000° F. discharge from the kiln through the flaring section 12 and into the expanding dust settling chamber 16 with a consequent reduction in velocity to a velocity considerably lower than that in the cylindrical part of the kiln. The hot gases then flow upwardly through the tower 20, the larger controlled portion passing through the chamber 24, while the remainder of the gases pass through the annular chamber 32. The gases which pass through the chamber 24 flow in part through the duct 38 and in part through the passageways 45 and duct 50 according to the controls provided. These gases, of course, are later combined in the duct 38 and finally flow through the duct 39 into the cyclone separator along with the gases from the duct 36. The gases passing through the annular space 32 are directed by the diverging wall section 28 into the duct 36 and then to the cyclone separator.

The pulverized feed stock evenly and uniformly distributed by the distributors 58 falls downwardly over the whole inside area of the cylinder 30 and chamber 24 through the rising kiln gases, the velocity of which is maintained such that only a relatively small percentage of the pulverized material is carried upwardly with the gases flowing through the duct 38. As the pulverized material falls through the gases, it is progressively heated up to a temperature approaching that of the kiln gases in the chamber 16 and falls onto the sloping wall 18 from which it slides into the rotary kiln. At the same time the kiln gases flowing through the chamber 24 or heat exchange zone are progressively cooled by the pulverized stock and the operation is so controlled that the gases reaching the inlet of the ducts 38 and 50 are at a temperature of from 500 to 600° F. Since the pulverized stock is extremely fine, the heat exchange between the kiln gases and the pulverized material is almost instantaneous so that the temperature of the gases is progressively reduced and that of the pulverized stock progressively increased.

The velocity of the gases through the chamber 24 and at all points in the heat exchange zone where they contact the pulverized stock is maintained at a point not exceeding approximately five feet per second or 300 feet per minute. It has been determined that, with this maximum velocity, the carryover of dust through the duct 38 will comprise only about 5% of the feed to the preheater. This velocity is regulated by hand operation of the damper 75 in accordance with the rate of dust collection in the cyclone separator 40 as compared with the rate of feed to the heat exchanger. The operator may also control the dampers 46 to regulate the division of the kiln gases flowing directly into the duct 38 and the duct 50. The dampers 46 are preferably regulated to provide a lower velocity through the cylinder 30 than that obtaining in the lower part of the chamber 24. Furthermore the dampers 46 are used to aid in evenly distributing the gases through the chamber 24 and the enlarged section of the chamber surrounded by the wall section 28, since the flow of gases through the passageways 45 will materially reduce the outflow of gases into the annular passageway 34, with the stated maximum velocity through the lower part of the chamber 24.

The extremely hot kiln gases passing around the metal cylinder 26 heats this cylinder and maintains at least its upper portion and the section 28 at a higher temperature than the kiln gases inside the cylinder 26 and section 28, thereby tending to prevent condensation of any alkaline material on the inner surfaces of the cylinder 26 and section 28. By the time the kiln gases flowing in the annular space 32 enter the duct 36 their temperature has been reduced considerably but they are still at too high a temperature to be sent to the cyclone separator 40, which is preferably made of sheet steel of the usual construction. Accordingly, air is admitted through the passageway 62 in sufficient quantity to reduce the temperature of the gases in the duct 36 to approximately 400° F. by the time they reach the thermocouple 67. The thermocouple in connection with the automatic control 65 effects an automatic control of the kiln gas temperature or mixture of gases flowing through the upper part of the duct 36 and mixing with the gases discharged from the duct 38.

While in some instances the gases in the duct 38 as they mix with the gases from the duct 36 may be no more than 400° F., provision is made for the introduction of air through the inlet 68 in response to the thermostat 74 to insure a gas temperature in the upper part of the duct 38 not in excess of 400° F. These controls permit the use of the usual sheet metals for making the cyclone separator 40 and parts of the ducts 36 and 38, as well as the ducts 39, 42 and 44. The fan 43, therefore, need not be of any special construction because of the relatively low temperature of the gases handled.

A control is provided for regulating the temperature of the gases delivered from the preheater to the duct 38 in order to insure a substantially constant temperature drop or gradient through the elements 26 and 28. The temperature of the kiln gases entering the duct 38 and which have contacted the relatively cool pulverized material as it enters the heat exchange zone is preferably about 600° F. Therefore, the thermocouple 84 is utilized in connection with the control 82 to operate the damper 80 to control the flow of gases through the duct 36. As the damper 80 moves toward closed position, in response to a fall in temperature below 600° F. at the thermocouple 84, the proportion of gases sent through the heat exchange zone is increased, and conversely, if the temperature is too high at the thermocouple 84, the valve 80 moves toward open position, thereby decreasing the proportion of gases sent through the heat exchange zone.

The suction applied by the exhauster 43 and the pressure differential through the preheating apparatus is controlled automatically by the valve 85 in response to the pressure at the point 89 in the dust settling chamber 16. The dust collected in the cyclone separator 40 is constantly or periodically discharged through a rotary valve seal 90 and delivered through a chute 91 into the hopper 54 where it mixes with the pulverized charging stock. Instead of delivering the dust from the cyclone separator 40 to the hopper 54, it may be delivered to some other part of the apparatus, as for example, directly into one of the distributors, chamber 24 or onto the sloping wall 18. A small amount of dust is recycled in the system but no great amount of recycle load is built up because the fine dust falling through the heat exchange zone in the tower 20 will adhere to somewhat larger particles and be agglomerated with products of fusion, so that even the finest dust is carried to the rotary kiln. The partial clinkering and $CO_2$ removal in the heat exchange zone increases the density of the particles.

A rotary cement kiln always produces more heat and temperature in the kiln gases than that required to preheat the charging stock to a temperature approaching that of the gases discharged from the kiln. In the present instance the excess gas is utilized in a very effective manner in the annular bypass channel 32 for heating the refractory metal walls 26 and 28. Furthermore, the bypassing of the part of the kiln gases through the annular space 32 aids in achieving uniform upward flow and distribution of the gas through the heat exchange zone, that is, a flow which may be called "quiescent."

In practice the diameter of the heat exchange zone is preferably at least 1½ times the internal diameter of the cylindrical part of the rotary kiln. These relative dimensions permit the use of a kiln gas velocity in the heat exchange zone which never exceeds the maximum of approximately five (5) feet per second, at which velocity the dust carryover from the heat exchange zone does not amount to much more than about 5% of the feed. The bypassing of gases through the annular passageway 32 also provides a control so that the kiln gas velocity in the heat exchange zone may be readily controlled. The inlet velocity may be considerably lower than 5 feet per second, even as low as 3 feet per second. The control of the velocity in the gas inlet portion of the heat exchange zone is of primary concern, since, as the gases are progressively cooled, their velocity is progressively reduced. Where an inlet velocity of 5 feet per second is used, the velocity at the top may be as low as 2 feet per second.

From the foregoing it will be apparent that the tower 20 is a relatively low tower compared to known types of installations, since the wall 26 need be no higher than its diameter and this height may even be less than its diameter and still heat the feed stock to approximately the temperature of the kiln gases discharged from the kiln, even when the fresh pulverized material is discharged directly into the upper portion of the space surrounded by the wall 26.

The apparatus of the present invention has the distinct advantage of being relatively inexpensive compared to known types of preheating apparatus. For example, the structures which must be lined with refractories are of simple construction and much of the equipment is unlined because the kiln gases are cooled before they enter such equipment.

When the method and apparatus of my invention are used, a rotary kiln of from 100 to 125 feet in length is all that is required, in contrast to some rotary cement kilns of from 300 to 400 feet in length. Furthermore, when it is desired to increase the throughput, a controlled electrostatic potential is applied to the dust distributor in the preheating zone to cause the distributed dust particles to adhere to each other or from agglomerates, particularly where it is desired to increase the throughput of a particular installation above that for which it was designed.

Other forms of distributors may be used in place of the distributors 58, although these distributors are particularly effective because of their spiral shape and the inclusion of an eccentric opening at the top through which the gases flow upwardly in contact with the distributed dust which is driven inwardly over a horizontal spiral flange at the bottom. The gases flowing through the openings in the distributors 58 may flow respectively to the outlets 45 controlled by the dampers 46, and instead of controlling the dampers 46 by hand, they are preferably individually automatically controlled by a thermostat responsive to the temperature of the gas flowing through the corresponding outlets 45, so as to maintain a constant temperature in each outlet 45.

I claim:

1. In an apparatus for calcining and clinkering pulverulent finely-divided dust-like solid materials for the production of cement including a clinkering kiln having inlet and discharge ends for calcining and clinkering the pulverulent solid material in contact with high-temperature gases, a preheating chamber for preheating the pulverulent solid material located at the inlet end of the kiln, the improvement in which the preheating chamber is a substantially unobstructed upright chamber the lower end of which is connected directly into the inlet end of the kiln for receiving high temperature gases therefrom, a dust distributing means located at the upper portion of the chamber for distributing the pulverulent material to be calcined into the chamber in intimate contact with the highly heated gases rising therethrough, means for collecting the resulting heated pulverulent material at the lower portion of the chamber and for conveying it into the inlet end of the kiln, means including walls surrounding said chamber in spaced relation providing a gas flow passageway around the outside of said chamber, said passageway being in communication with the inlet end of the kiln for receiving a portion of the hot gases therefrom for heating the wall of said chamber, means for inducing a flow of hot gases through the kiln and upwardly through the chamber and through the passageway surrounding the chamber, and ducts respectively connected with the upper part of the chamber and with the upper part of said passageway surrounding the chamber leading to the inlet of the inducing means, and means for controlling the flow of gases through said ducts.

2. The method of preheating solid pulverulent dust-like material to be calcined and clinkered in a kiln, comprising passing high temperature gases from the clinkering operation in the kiln upwardly through an enlarged unobstructed preheating zone having a cross-sectional flow area sufficient to provide a quiescent free upward gas flow of relatively low velocity through the zone, applying suction to the gases in the upper portion of the preheating zone to create an induced draft through the kiln, distributing the finely-divided pulverulent material to be heated in the form of fine dust-like particles into substantially all parts of the gas stream in the upper portion of the preheating zone, controlling the velocity of the hot gases in the preheating zone to a maximum of not in excess of five feet per second to permit the falling of the pulverulent dust-like particles downwardly through and in intimate contact with the gas stream to the lower portion of the preheating zone thereby heating the pulverized solid material to approximately the temperature of the highly heated gases entering the preheating zone from the kiln, bypassing the preheating zone with a portion of the highly heated gases from the kiln to aid in said velocity control, controlling the velocity of the gases in the preheating zone in accordance with the fineness of the solid material distributed into the preheating zone to prevent appreciable carryover of finely divided solid material from the preheating zone, discharging the gases from the upper portion of the preheating zone, and delivering the preheated material from the lower portion of the preheating zone into the kiln.

3. The method of preheating solid pulverulent dust-like material to be calcined and clinkered in a kiln, comprising passing high temperature gases from the clinkering operation in the kiln upwardly through an enlarged unobstructed preheating zone having a cross-sectional flow area sufficient to provide a quiescent free upward gas flow of relatively low velocity through the zone, conducting a portion of the hot gases from the kiln around the preheating zone, effecting a uniform upward flow of kiln gases through the preheating zone, distributing the finely-divided pulverulent material to be heated in the form of fine dust-like particles into substantially all parts of the gas stream in the upper portion of the preheating zone, controlling the velocity of the hot gases in the preheating zone to permit the falling of the pulverulent dust-like particles downwardly through and in intimate contact with the gas stream to the lower portion of the preheating zone thereby heating the pulverized solid material to approximately the temperature of the highly heated gases entering the preheating zone from the kiln, controlling the velocity of the gases in the preheating zone in accordance with the fineness of the solid material distributed into the preheating zone to prevent appreciable carryover of finely divided solid material from the preheating zone, discharging the gases from the upper portion of the preheating zone, and delivering the preheated material from the lower portion of the preheating zone into the kiln.

4. In an apparatus for calcining and clinkering pulverulent finely-divided dust-like solid materials for the production of cement including a clinkering kiln having inlet and discharge ends for calcining and clinkering the pulverulent solid material in contact with high temperature gases, and a preheating chamber for preheating pulverulent solid material located at the inlet end of the kiln, the improvement comprising a substantially unobstructed upright preheating chamber, the lower portion of which is connected directly into the inlet end of the kiln for receiving high temperature gases therefrom, a tower having walls surrounding the sides of the preheating chamber in spaced relation, the chamber having an open lower end into which the kiln gases flow, a dust distributing means located at the upper portion of the preheating chamber for distributing pulverulent finely divided dust-like solid material to be calcined and clinkered into the upper portion of said chamber in intimate contact with the highly heated gases rising therethrough, means for collecting the resulting heated pulverulent solid material falling through the gas in the chamber at the lower portion of said chamber and for conveying it into the inlet of the kiln, gas flow ducts leading respectively from the upper part of the chamber and the upper part of the space in the tower surrounding the chamber for conducting gases therefrom, and means connected into said ducts for inducing a flow of highly heated gases through the kiln and upwardly through the tower and chamber, whereby the pulverulent dust-like solid material to be calcined and clinkered is substantially instantaneously heated in the preheating chamber to approximately the temperature of the highly heated gases entering the chamber during the fall of the solid material downwardly through the upflowing gases in the chamber.

References Cited in the file of this patent

UNITED STATES PATENTS

| | | |
|---|---|---|
| 1,955,914 | Kolzapfel | Apr. 24, 1934 |
| 2,190,234 | Hasselback et al. | Feb. 13, 1940 |
| 2,409,707 | Roetheli | Oct. 22, 1946 |
| 2,750,182 | Petersen | June 12, 1956 |